(12) United States Patent
Hsiao et al.

(10) Patent No.: US 12,055,178 B2
(45) Date of Patent: Aug. 6, 2024

(54) HINGE DEVICE

(71) Applicant: FOSITEK CORPORATION, New Taipei (TW)

(72) Inventors: Chin-Yu Hsiao, New Taipei (TW); Huan-Yu Huang, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/975,277

(22) Filed: Oct. 27, 2022

(65) Prior Publication Data

US 2024/0018994 A1    Jan. 18, 2024

(30) Foreign Application Priority Data

Jul. 18, 2022  (TW) .................................. 111126923

(51) Int. Cl.
*F16C 11/04* (2006.01)
*G06F 1/16* (2006.01)
*E05F 3/16* (2006.01)

(52) U.S. Cl.
CPC ............ *F16C 11/04* (2013.01); *G06F 1/1681* (2013.01); *E05F 3/16* (2013.01); *E05Y 2999/00* (2024.05)

(58) Field of Classification Search
CPC .......... F16C 11/04; G06F 1/1681; E05F 3/16; E05Y 2900/606; E05D 11/1078; E05D 11/087

See application file for complete search history.

(56) References Cited

U.S. PATENT DOCUMENTS

| | | | | |
|---|---|---|---|---|
| 5,923,751 A * | 7/1999 | Ohtsuka | .............. | H04M 1/0218 |
| | | | | 379/434 |
| 6,568,034 B2 * | 5/2003 | Cho | ...................... | E05D 11/081 |
| | | | | 16/337 |
| 6,665,906 B2 * | 12/2003 | Li | ....................... | E05D 11/1007 |
| | | | | 16/303 |
| 6,748,625 B2 * | 6/2004 | Lu | ........................ | G06F 1/1679 |
| | | | | 16/374 |

(Continued)

FOREIGN PATENT DOCUMENTS

CN    108021186 A  *  5/2018  ............... E05D 3/04
TW     381990 U   *  6/2010

(Continued)

*Primary Examiner* — Christine M Mills
*Assistant Examiner* — Matthew J Sullivan
(74) *Attorney, Agent, or Firm* — Demian K. Jackson; Jackson IPG PLLC

(57) ABSTRACT

A hinge device includes a fixed shaft, a rotating sleeve, a fixed connection member, a torsion spring, a rotating connection member and a friction resistance assembly. The rotating sleeve is rotatably mounted on the fixed shaft and is located between a fixed end and a free end. One end of the fixed connection member is fixedly connected to the free end, and the other end is provided with a first slot. Two ends of the torsion spring are respectively equipped with a first snap-in pin and a second snap-in pin. The first snap-in pin inserts into the first slot. An extension part protrudes from a fixed part of the of the rotating connection member and is provided with a second slot. The second snap-in pin inserts into the second slot. The friction resistance assembly is disposed on the fixed shaft to provide torsional resistance to the rotating sleeve.

13 Claims, 12 Drawing Sheets

(56) References Cited

U.S. PATENT DOCUMENTS

| | | | |
|---|---|---|---|
| 6,779,234 B1* | 8/2004 | Lu | G06F 1/1681 16/334 |
| 7,017,233 B2* | 3/2006 | Hsu | H04M 1/0216 16/324 |
| 7,100,239 B2* | 9/2006 | Duan | G06F 1/1616 16/303 |
| 7,712,188 B2* | 5/2010 | Sung | E05D 11/087 16/339 |
| 7,823,254 B2* | 11/2010 | Lin | E05D 11/087 16/337 |
| 7,874,045 B2 | 1/2011 | Kitamura et al. | |
| 7,971,318 B2* | 7/2011 | Kim | E05F 1/1207 16/303 |
| 8,065,780 B2* | 11/2011 | Chiang | G06F 1/1616 16/361 |
| 8,205,301 B2* | 6/2012 | Wang | G06F 1/1681 16/303 |
| 8,261,412 B1* | 9/2012 | Lin | G06F 1/1681 16/374 |
| 8,898,860 B2* | 12/2014 | Bacchetti | E05F 3/20 16/303 |
| 9,009,919 B1* | 4/2015 | Chiang | G06F 1/1681 16/303 |
| 9,388,617 B2* | 7/2016 | Onda | E05D 11/082 |
| 9,856,909 B1* | 1/2018 | Hsu | F16M 11/10 |
| 11,256,289 B2* | 2/2022 | Liu | G06F 1/1637 |
| 11,360,523 B2* | 6/2022 | Chen | G06F 1/1681 |
| 2002/0133908 A1* | 9/2002 | Lin | G06F 1/1681 16/346 |
| 2004/0088825 A1* | 5/2004 | Lu | G06F 1/1616 16/285 |
| 2006/0085947 A1* | 4/2006 | Ge | H04M 1/0216 16/303 |
| 2006/0213030 A1* | 9/2006 | Lu | G06F 1/1616 16/221 |
| 2007/0294859 A1* | 12/2007 | Hsu | H04M 1/0216 16/330 |
| 2008/0078058 A1* | 4/2008 | Hsu | G06F 1/1681 16/337 |
| 2009/0255091 A1* | 10/2009 | Jung | E05F 3/20 16/308 |
| 2010/0125977 A1* | 5/2010 | Shen | G06F 1/1616 16/374 |
| 2010/0319162 A1* | 12/2010 | Kubota | H04M 1/0216 16/236 |
| 2013/0160243 A1* | 6/2013 | Kakizaki | G06F 1/1681 16/341 |
| 2014/0047672 A1* | 2/2014 | Saito | H04M 1/0216 16/341 |
| 2014/0304947 A1* | 10/2014 | Wang | G06F 1/1616 16/325 |
| 2014/0331452 A1* | 11/2014 | Zhang | G06F 1/1681 16/337 |
| 2021/0285272 A1* | 9/2021 | Chiang | G06F 1/1681 |
| 2022/0018423 A1* | 1/2022 | Hsiao | F16H 13/14 |
| 2022/0075429 A1* | 3/2022 | Hazama | G06F 1/1681 |
| 2022/0408580 A1* | 12/2022 | Shin | H04M 1/02 |

FOREIGN PATENT DOCUMENTS

| | | | | |
|---|---|---|---|---|
| TW | M381990 U | | 6/2010 | |
| TW | 201341679 A | * | 10/2013 | |
| TW | 201341679 A | | 10/2013 | |
| TW | 202204776 A | | 2/2022 | |
| TW | 633228 U | * | 10/2022 | |
| TW | M633228 U | | 10/2022 | |
| WO | WO-2005054695 A1 | * | 6/2005 | G06F 1/1616 |

* cited by examiner

HINGE DEVICE

CROSS-REFERENCE TO RELATED APPLICATIONS

This non-provisional application claims the benefit of priority on Taiwan Patent Application No. 111126923 filed on Jul. 18, 2022, the entire contents of which are hereby incorporated by reference.

BACKGROUND

Technical Field

This disclosure relates a hinge device, and more particularly, to a hinge device satisfying the purpose of "open light, close heavy".

Related Art

A foldable electronic device, such a laptop computer, a foldable phone or the like, is equipped with a hinge device to connect two bodies, such that an included angle defined by the two bodies is able to be arbitrarily changed between zero degrees to 360 degrees. Usually the two bodies include a seat to be placed on a desk and a folding part. To the user, the preferable unfolding operation is to open up the folding part by one hand. And the preferable unfolding operation to having slight resistance when closing the folding part to avoid accidental closing due to wrong operation.

Therefore, a hinge device is preferably equipped with characteristic of "open light, close heavy". To satisfy the purpose of "open light, close heavy", the hinge device in the art is usually equipped with plural torsion springs to provide torques in different rotational directions, so as to satisfy the purpose of "open light, close heavy". However, such an approach is difficult to assemble the hinge device; in particular, installing plural torsion springs in a small internal space of the hinge device is complex and difficult.

Another approach is to provide a relatively large resistance at a designated included angle by utilizing a cam structure, and to provide frictional resistances at other included angles. The relatively large resistance is to fix the folding part in the folded state and to provide large torsional resistance from the unfolded state to the folded state. However, the relatively large resistance also generates a peak value of the torsional resistance and fails to satisfy the purpose of "open light", such that it is difficult to unfold the folded electronic device by one hand.

SUMMARY

In view of the above problems, this disclosure provides a hinge device satisfying the purpose of "open light, close heavy", and the hinge device has simple structure and is small-sized.

This disclosure provides a hinge device including a fixed shaft, a rotating sleeve, a fixed connection member, a torsion spring, a rotating connection member and a friction resistance assembly. The fixed shaft includes a fixed end and a free end. The rotating sleeve is rotatably mounted on the fixed shaft, and is located between the fixed end and the free end. The fixed connection member includes coupling end and connection end. The coupling end is fixedly connected to the free end, and the connection end is provided with a first slot perpendicular to the fixed shaft. The torsion spring includes a first end and a second end. The first end is equipped with a first snap-in pin, the second end is equipped with a second snap-in pin, and the first snap-in pin is configured to insert into the first slot. The rotating connection member includes fixed part and extension part. The extension part protrudes on the fixed part, and extends towards the fixed connection member. The extension part is provided with a second slot perpendicular to the fixed shaft, and the second snap-in pin is configured to insert into the second slot. The friction resistance assembly is disposed on the fixed shaft to provide torsional resistance to the rotating sleeve.

In at least one embodiment, peripheral surfaces of the free end, the rotating sleeve and the fixed part are provided with knurls parallel to the fixed shaft; or peripheral surfaces of the free end, the rotating sleeve and the fixed part are provided with concave and convex structures.

In at least one embodiment, the coupling end includes an insertion hole, and a cross-section of the insertion hole is non-circular; a cross-section of is non-circular and matches the cross-section of the insertion hole, such that the fixed connection member is not able to rotate with respect to the fixed shaft.

In at least one embodiment, when the torsion spring and the fixed shaft are disposed coaxially, the first snap-in pin and the second snap-in pin are perpendicular to the fixed shaft.

In at least one embodiment, the friction resistance assembly includes a stopper fixed on the fixed shaft; a cam member sleeved on the fixed shaft, wherein the cam member is configured to slide on the fixed shaft along an axial direction of the fixed shaft, and the cam member is fixed in a rotational direction with respect to the axial direction of the fixed shaft; and a compression elastic member, sleeved on the fixed shaft, and two ends of the compression elastic member respectively abut against the stopper and the cam member, such that the cam member contacts the rotating sleeve to provide the torsional resistance to the rotating sleeve.

In at least one embodiment, the stopper is a screw nut screwed on the fixed shaft.

In at least one embodiment, the fixed shaft includes a guiding section, a cross-section of the guiding section is non-circular; the cam member includes a guiding hole, a cross-section of the guiding hole matches the cross-section of the guiding section, and the cam member is sleeved on the guiding section.

In at least one embodiment, the rotating sleeve includes a sleeve contact surface facing the cam member, the cam member includes a cam contact surface facing the rotating sleeve, and the sleeve contact surface and the cam contact surface are configured to contact each other.

In at least one embodiment, a bump and a recess are respectively disposed on the cam contact surface and the sleeve contact surface; the recess is provided with a bottom surface, a first inclined surface and a second inclined surface, the first inclined surface and the second inclined surface are connected to the bottom surface, and the bump is configured to engage into the recess, such that the bump contacts the first inclined surface and the second inclined surface.

In at least one embodiment, when the bump engages into the recess, the torsion spring provides a forward torque.

In at least one embodiment, the hinge device further includes a rotating member, the rotating member includes a sleeve fixing hole; wherein the rotating sleeve is disposed in the sleeve fixing hole and fixed to the rotating member, and the fixed part of the rotating connection member is disposed in the sleeve fixing hole and fixed to the rotating member.

In at least one embodiment, the torsion spring is disposed in the sleeve fixing hole.

In at least one embodiment, the hinge device further includes a seat, wherein the seat includes a fixing hole, and the free end of the fixed connection member inserts into the fixing hole and is fixed in the fixing hole.

Through the above approaches, when the hinge device of this disclosure is unfolded from the folded state to the unfolded state, a forward torque generated by the torsion spring neutralizes the resistance generated by the cam member and the frictional resistance. On the contrary, when the hinge device switches from unfolded state to folded state, the forward torque of the torsion spring becomes main resistance, so as to satisfy the purpose of "open light, close heavy", such that it is easy to unfold the folded electronic device by one hand.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
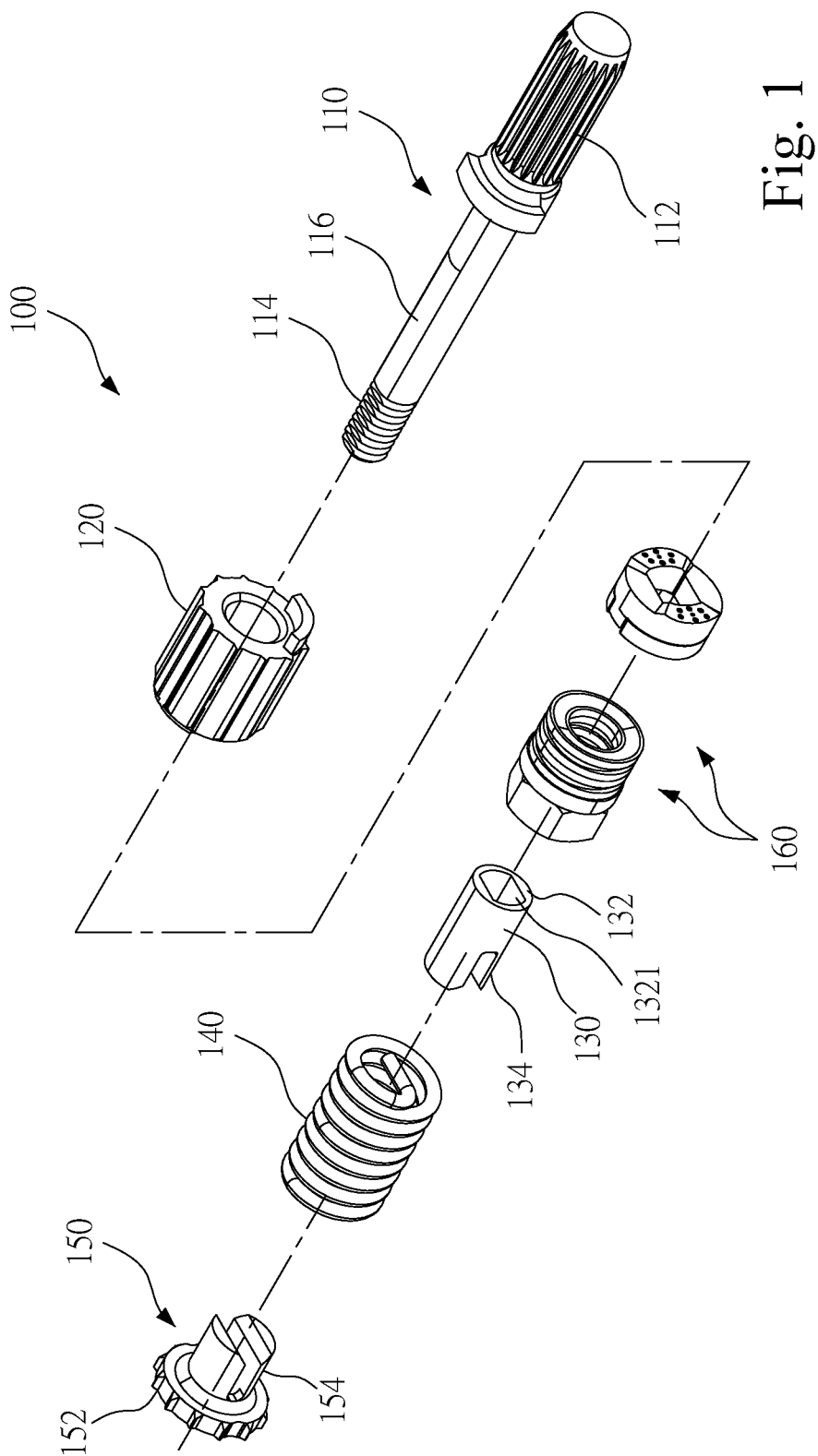
FIG. 1 is an exploded view of a hinge device according to an embodiment of this disclosure.

FIG. 1, FIG. 2, FIG. 3 and FIG. 4 show a hinge device 100 according to the embodiment of this disclosure. The hinge device 100 includes a fixed shaft 110, a rotating sleeve 120, a fixed connection member 130, a torsion spring 140, a rotating connection member 150 and a friction resistance assembly 160. The hinge device 100 is able to be set individually or paired coaxially with another hinge device 100. The hinge device 100 is configured to connect two bodies, such that the bodies are pivoted to each other to form a foldable electronic device. An example of the foldable electronic device is a support assembly constituted by a bracket and a keyboard.

As shown in FIG. 1, FIG. 2, FIG. 3 and FIG. 4, the fixed shaft 110 is made of material having high rigidity, such as stainless steel. The fixed shaft 110 includes a fixed end 112 and a free end 114. The fixed end 112 is fixed to one of the two bodies; for example, the fixed end 112 is fixed to the seat 210.

Specifically, the seat 210 includes a fixing hole 212, and a peripheral surface of the free end 114 is provided with knurls parallel to the fixed shaft 110, or the peripheral surface of the free end 114 is provided with concave and convex structures. The fixed end 112 is configured to insert into the fixing hole 212, so as fix the fixed end 112 in the fixing hole 212 in a tighten fit manner. Meanwhile, the knurls or the combination of concave and convex structures prevent the fixed shaft 110 from rotating with respect the seat 210, so as to ensure that the fixed end 112 of the fixed shaft 110 is fixed to the seat 210. Other fixing method for fixing the fixed end 112 of the fixed shaft 110 to the seat 210 is not excluded in this disclosure. The free end 114 is configured to be connected to another body, such as a rotating member 220, in a rotatable manner. Specifically, the rotating member 220 includes a sleeve fixing hole 222. The rotating sleeve 120 is disposed in the sleeve fixing hole 222 and fixed to the rotating member 220. The free end 114 is connected to rotating member 220 via the rotating sleeve 120 in a rotatable manner, such that rotating member 220 is allowed to rotate with respect to the fixed shaft 110. In an example, the seat 210 is a part of a keyboard, a part connected to the keyboard, or a part connected to a body including a keyboard; the rotating member 220 is a part of a bracket for supporting a tablet computer or a display device, or the rotating member 220 is an additional component connected to bracket. Or, the seat 210 and the rotating member 220 are parts of the hinge device 100 for respectively connect two bodies, such that the two bodies are able to be folded or unfolded about the hinge device 100.

As shown in FIG. 1, FIG. 2, FIG. 3 and FIG. 4, the rotating sleeve 120 is rotatably mounted on the fixed shaft 110, and is located between the fixed end 112 and the free end 114. The rotating sleeve 120 is disposed in the sleeve fixing hole 222, and fixed to the rotating member 220, such that the rotating sleeve 120 and the rotating member 220 rotate together. The rotating sleeve 120 also serves as a bearing to have the free end 114 be connected to the rotating member 220 in a rotatable manner. Similarly, a peripheral surface of the rotating sleeve 120 is provided with knurls parallel to the fixed shaft 110 or the peripheral surface of rotating sleeve 120 is provided with concave and convex structures, so as to fix the rotating sleeve 120 in the sleeve fixing hole 222 through interference fit provided by the knurls or the combination of concave and convex structures.

As shown in FIG. 1, FIG. 2, FIG. 3 and FIG. 4, the fixed connection member 130 includes a coupling end 132 and a connection end 134. The coupling end 132 is fixedly connected to the free end 114 of the fixed shaft 110, so as to fix the fixed connection member 130 to the fixed shaft 110, and the fixed connection member 130 does not rotate with respect to the fixed shaft 110. In an example, the coupling end 132 includes an insertion hole 1321. A cross-section of the insertion hole 1321 is non-circular. For example, the cross-section of the insertion hole 1321 may be configured into rectangle, triangle or D-shaped. A cross-section of the free end 114 is also non-circular and matches the cross-section of the insertion hole 1321, so as to at least fix the fixed connection member 130 to the fixed shaft 110 in rotational direction; that is, the fixed connection member is not able to rotate with respect to the fixed shaft.

Figure 4:
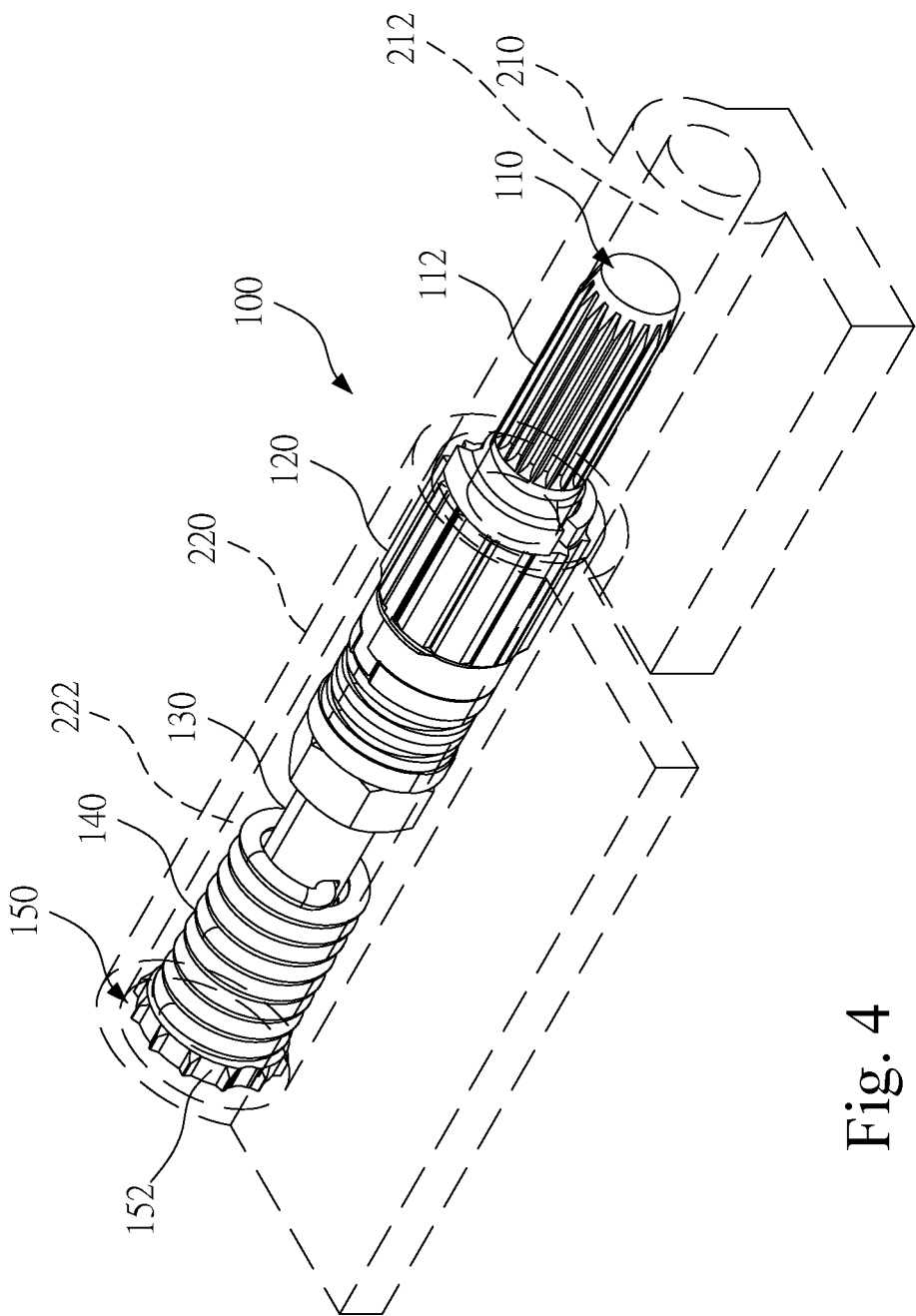
Figure 5:
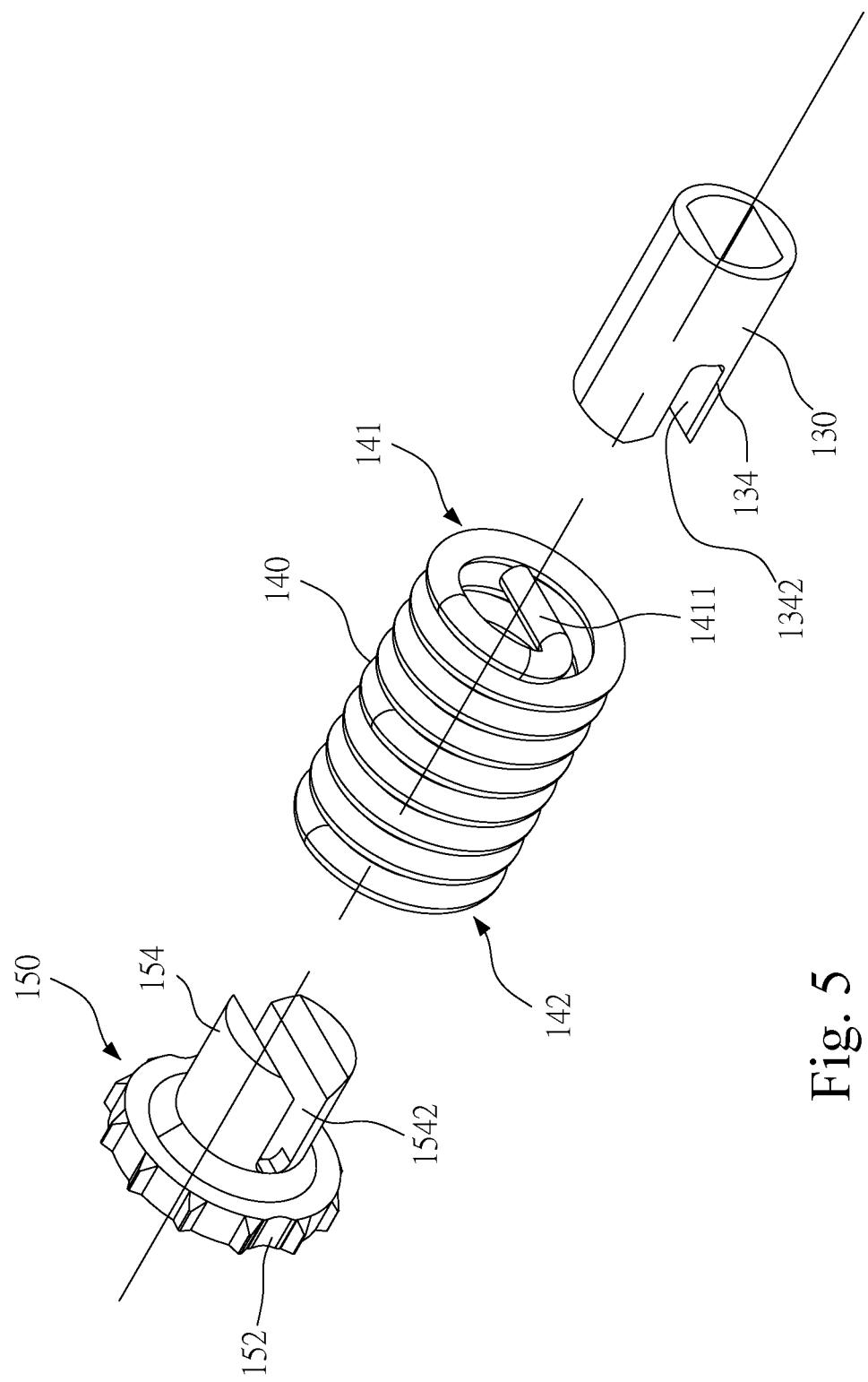
FIG. 5 and FIG. 6 are exploded views of a rotating connection member, a torsion spring and a fixed connection member of the hinge device according to the embodiment of this disclosure.
Figure 6:
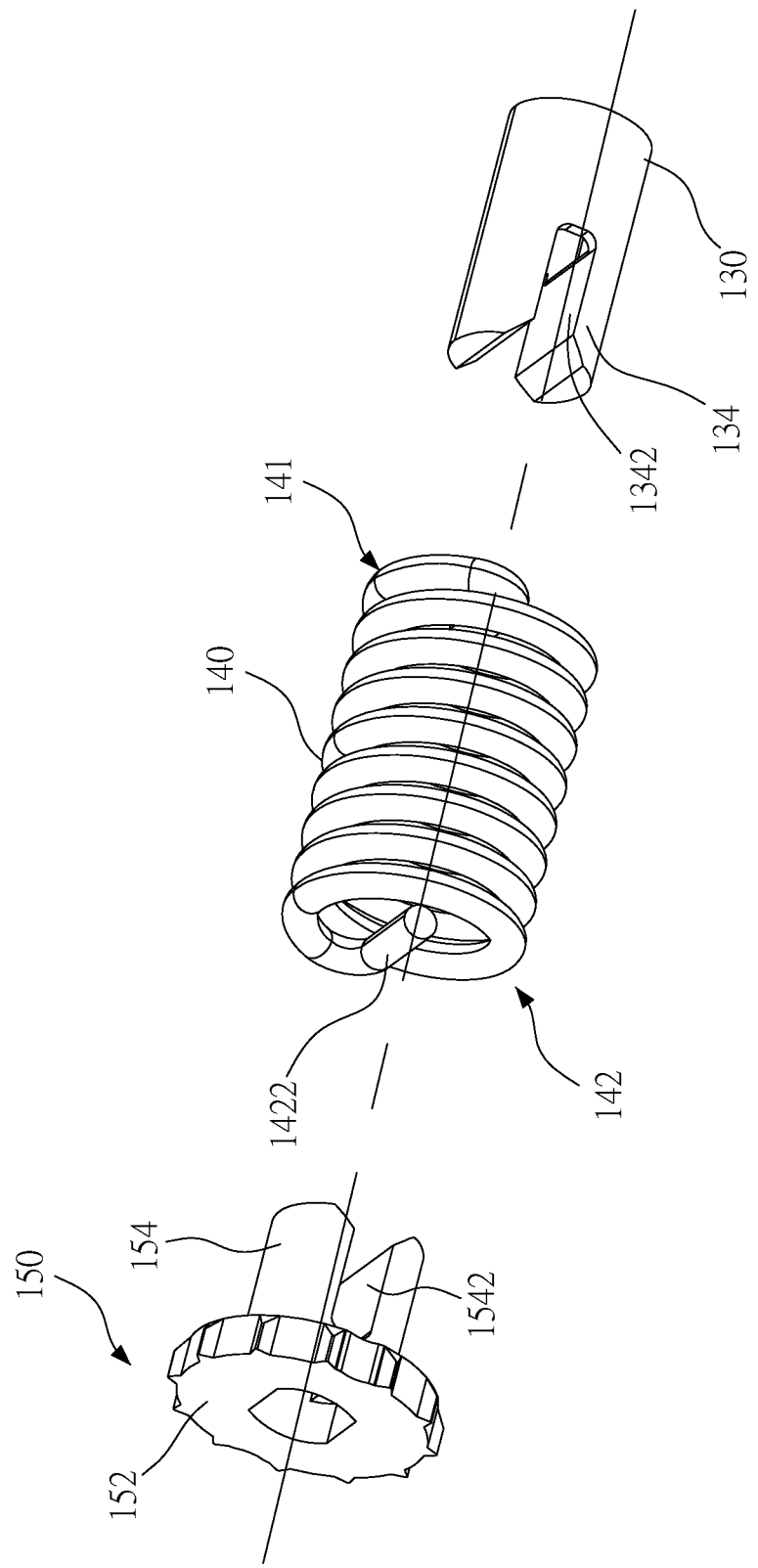
Figure 7:
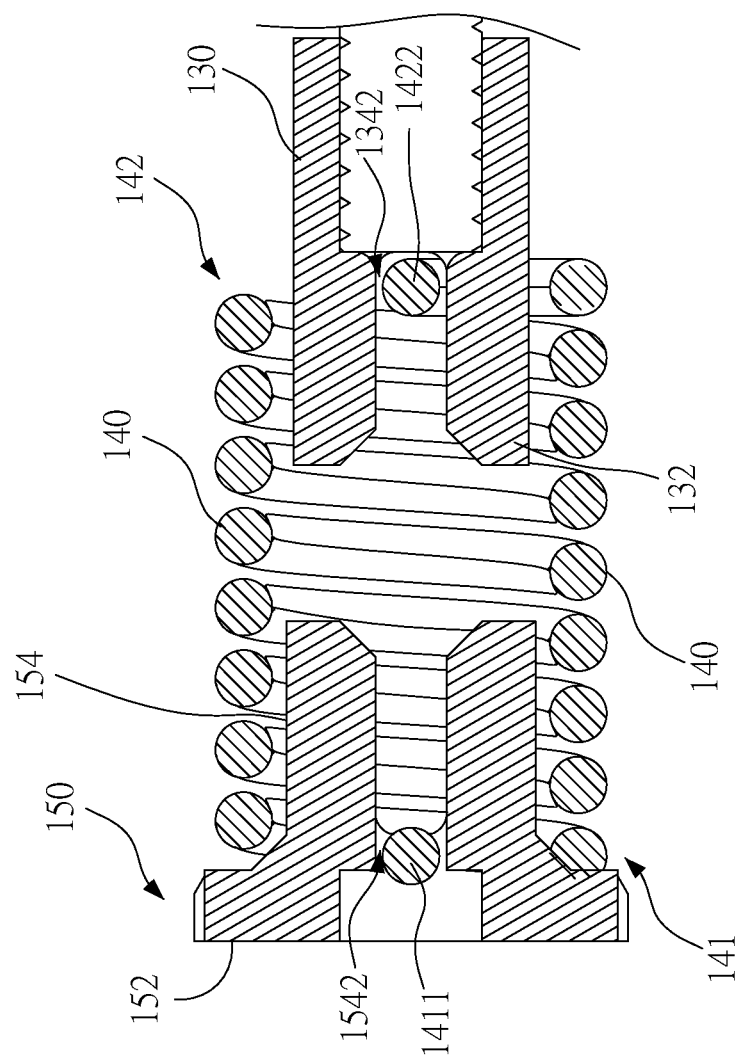
FIG. 7 is a cross-sectional view showing the rotating connection member, the torsion spring and the fixed connection member of the hinge device according to the embodiment of this disclosure.

As shown in FIG. 1, FIG. 5, FIG. 6 and FIG. 7, the torsion spring 140 includes a first end 141 and a second end 142. The first end 141 is equipped with a first snap-in pin 1411, and the second end 142 is equipped with the second snap-in pin 1422. The first snap-in pin 1411 and the second snap-in pin 1422 are transversely; that is when the torsion spring 140 and the fixed shaft 110 are disposed coaxially, the first snap-in pin 1411 and the second snap-in pin 1422 are perpendicular to the fixed shaft 110. As shown in FIG. 4, the torsion spring 140 is disposed in the sleeve fixing hole 222, and the first snap-in pin 1411 is configured to insert into the first slot 1342 of the fixed connection member 130, such that the first snap-in pin 1411 and the fixed connection member 130 rotate together.

As shown in FIG. 1, FIG. 5, FIG. 6 and FIG. 7, the rotating connection member 150 includes a fixed part 152 and an extension part 154. The fixed part 152 is disposed in the sleeve fixing hole 222, and is fixed to the rotating member 220. The extension part 154 is located in the sleeve fixing hole 222. A peripheral surface of the fixed part 152 is provided with knurls parallel to the fixed shaft 110 or the peripheral surface of r fixed part 152 is provided with concave and convex structures, so as to fix the fixed part 152 in the sleeve fixing hole 222 through interference fit provided by the knurls or the combination of concave and convex structures. The extension part 154 protrudes on the fixed part 152, and extends towards the fixed connection member 130; that is the extension part 154 is located in the sleeve fixing hole 222. The extension part 154 is provided with second slot 1542 perpendicular to the fixed shaft 110. The second snap-in pin 1422 of the torsion spring 140 is configured to insert into the second slot 1542 of the extension part 154, such that the second snap-in pin 1422 and extension part 154 rotate together. Both the rotating connection member 150 and the rotating sleeve 120 are combined with the rotating member 220; therefore, the rotating member 220, the rotating connection member 150 and the rotating sleeve 120 rotates together with respect to the seat 210 and the fixed shaft 110 to turn and deform the torsion spring 140, such that the torsion spring 140 generates a reverse torque.

Figure 2:
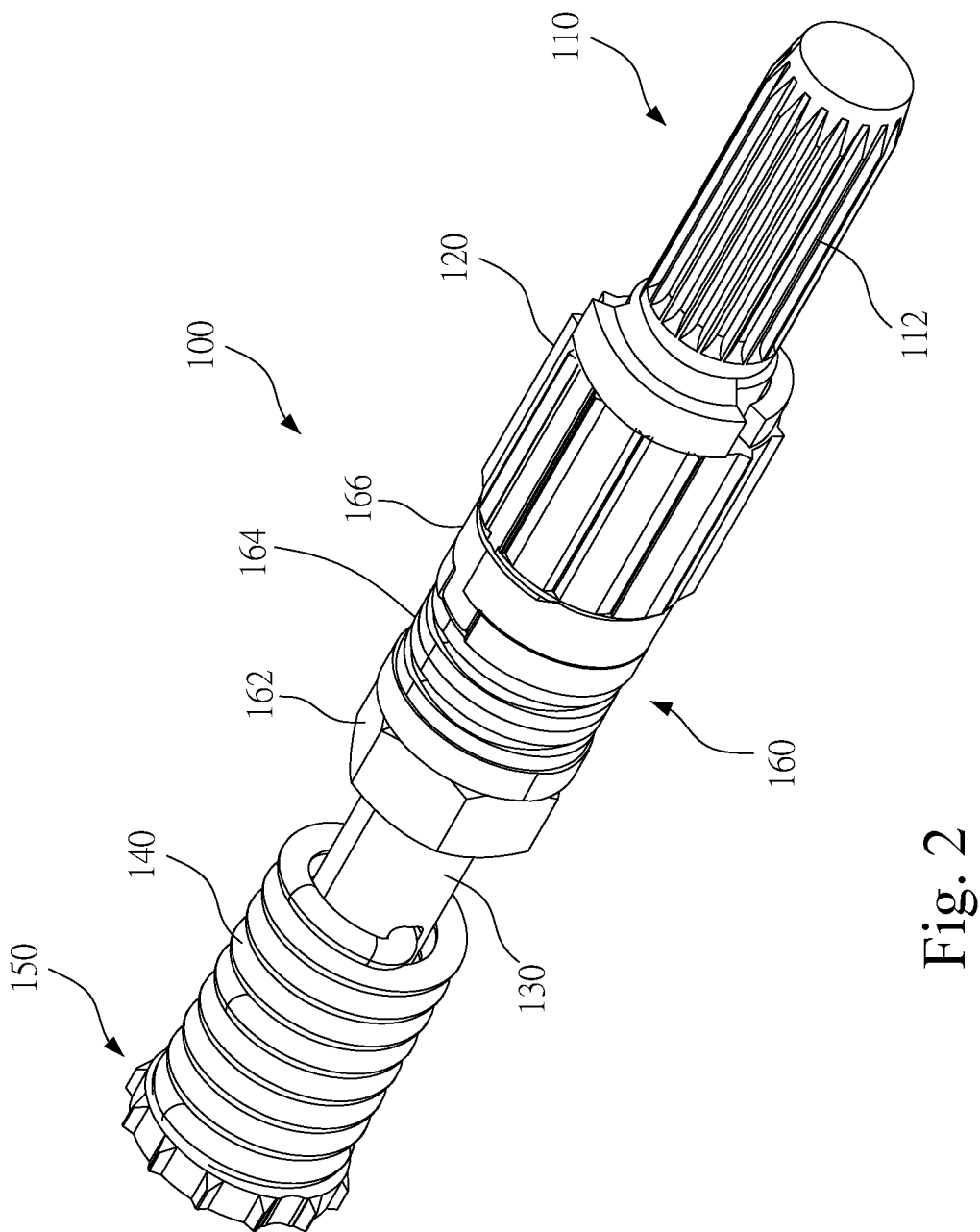
FIG. 2 is a perspective view of the hinge device according to the embodiment of this disclosure.
Figure 3:
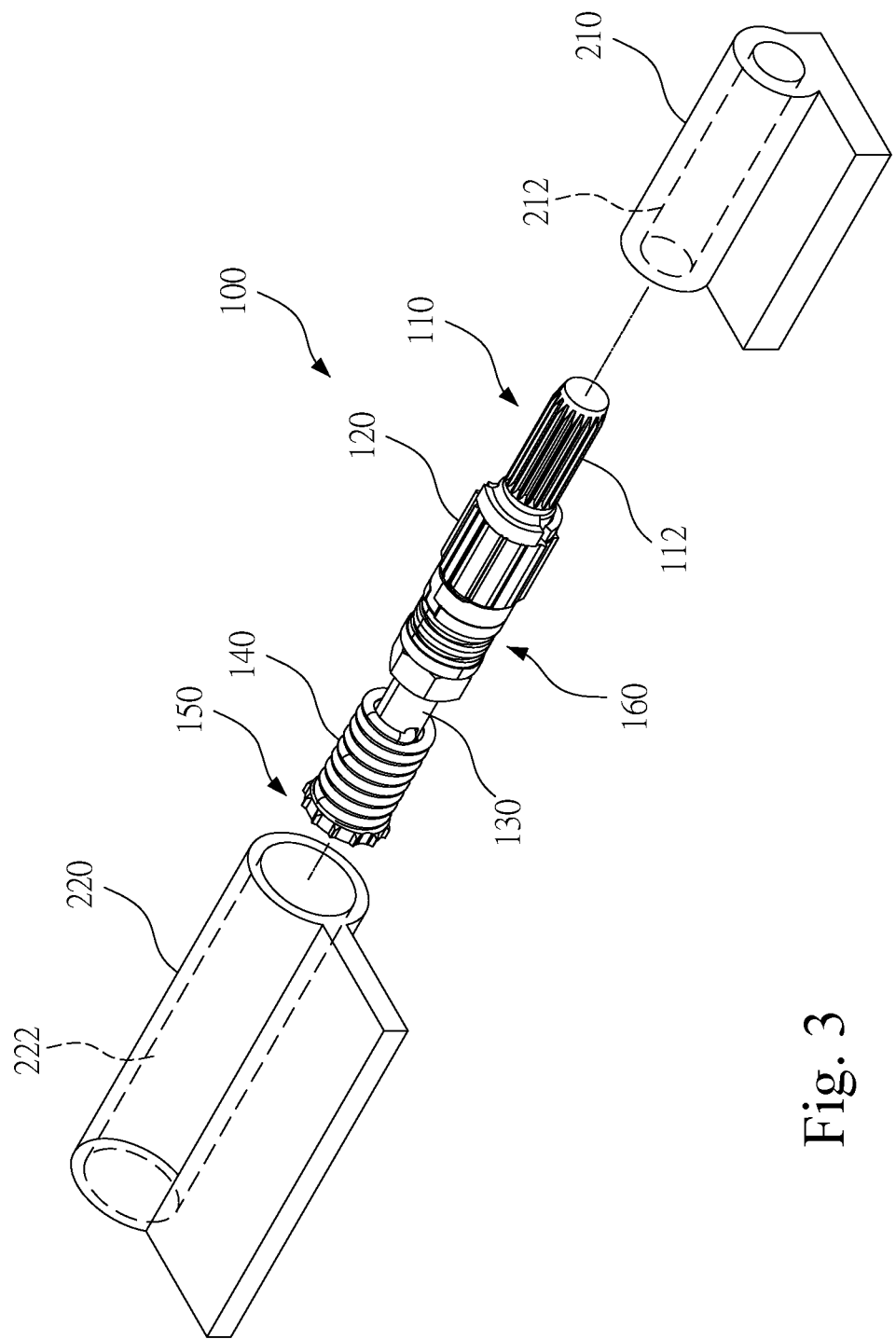
FIG. 3 and FIG. 4 are perspective views of the hinge device according to the embodiment of this disclosure.

As shown in FIG. 1, FIG. 2 and FIG. 3, the friction resistance assembly 160 disposed on the fixed shaft 110, to provide torsional resistance to the rotating sleeve 120.

Figure 8:
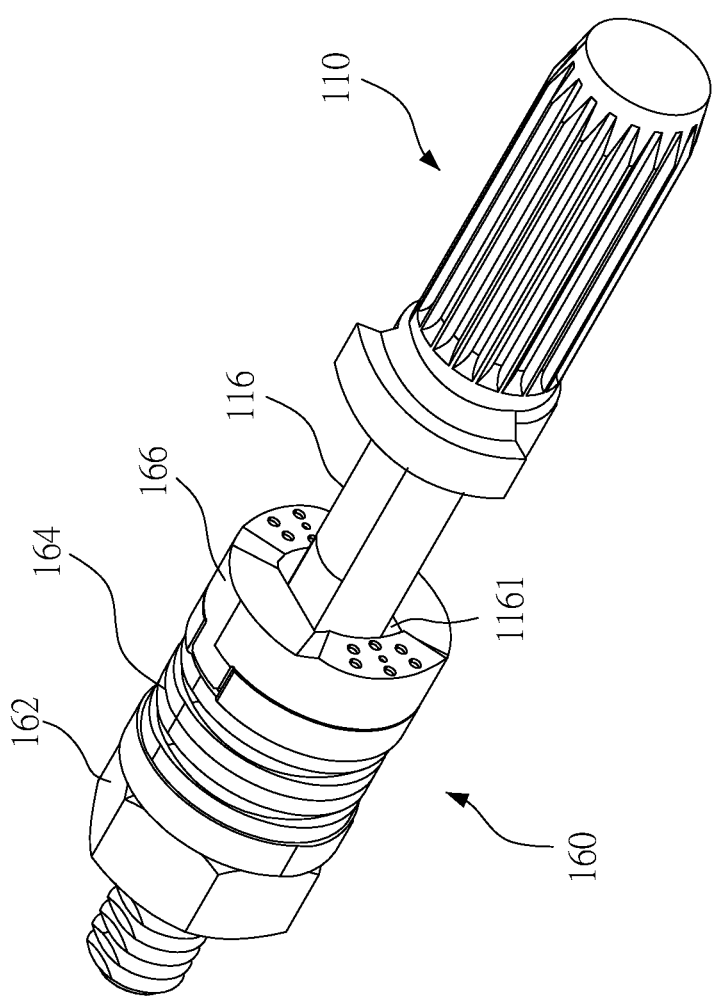
FIG. 8 is perspective view showing the fixed shaft and the friction resistance of the hinge device according to the embodiment of this disclosure.

As shown in FIG. 2 and FIG. 8, the friction resistance assembly 160 includes a stopper 162, a compression elastic member 164 and a cam member 166. The stopper 162 is fixed on the fixed shaft 110, and the cam member 166 is sleeved on the fixed shaft 110. The cam member 166 is configured to slide on the fixed shaft 110 along an axial direction of the fixed shaft 110, and the cam member 166 is fixed in a rotational direction with respect to the fixed shaft 110. The compression elastic member 164 is sleeved on the fixed shaft 110, and two ends of the compression elastic member 164 respectively abut against the stopper 162 and the cam member 166, so as to be compressed by the stopper 162 and the cam member 166. The compression elastic member 164 pushes the cam member 166, such that the cam member 166 contacts the rotating sleeve 120 to provide resistance to the rotating sleeve 120.

As shown in FIG. 2 and FIG. 8, in an example, the stopper 162 is a screw nut screwed on the fixed shaft 110. That is, the screw nut can combined with screw thread of the free end 114. The compression elastic member 164 may be configured to directly abut against the stopper 162 and the cam member 166, or washes or spacers may be provided between the compression elastic member 164 and the stopper 162/cam member 166.

The type of the compression elastic member 164 is not limited. As shown in FIG. 2 and FIG. 8, the compression elastic member 164 is constituted of plural bowl-shaped elastic sheets, and the bowl-shaped elastic sheets are sleeved on the fixed shaft 110. The adjacent bowl-shaped elastic sheets are inverted to each other. In another example, the compression elastic member 164 is a compression spring sleeved on the fixed shaft 110.

As shown in FIG. 1 and FIG. 8, the fixed shaft 110 includes a guiding section 116 located between the free end 114 and the fixed end 112 之間. A cross-section of the guiding section 116 is non-circular. For example, the cross-section of the guiding section 116 may be configured into rectangle, triangle or D-shaped. The cam member 166 includes a guiding hole 1161, and a cross-section of the guiding hole 1161 is also non-circular. The cross-section of the guiding hole 1161 match the cross-section of of the guiding section 116. The cam member 166 is sleeved on guiding section 116. Through the guiding section 116 and the guiding hole 1161, the cam member 166 is able to slide on the fixed shaft 110 along the axial direction of the fixed shaft 110, so as to be pushed by the compression elastic member 164 to contact the rotating sleeve 120. Meanwhile, the cam member 166 does not rotate with respect to the fixed shaft 110; that is, when the fixed shaft 110 is fixed, the cam member 166 is also fixed and is not able to rotate.

Figure 9:
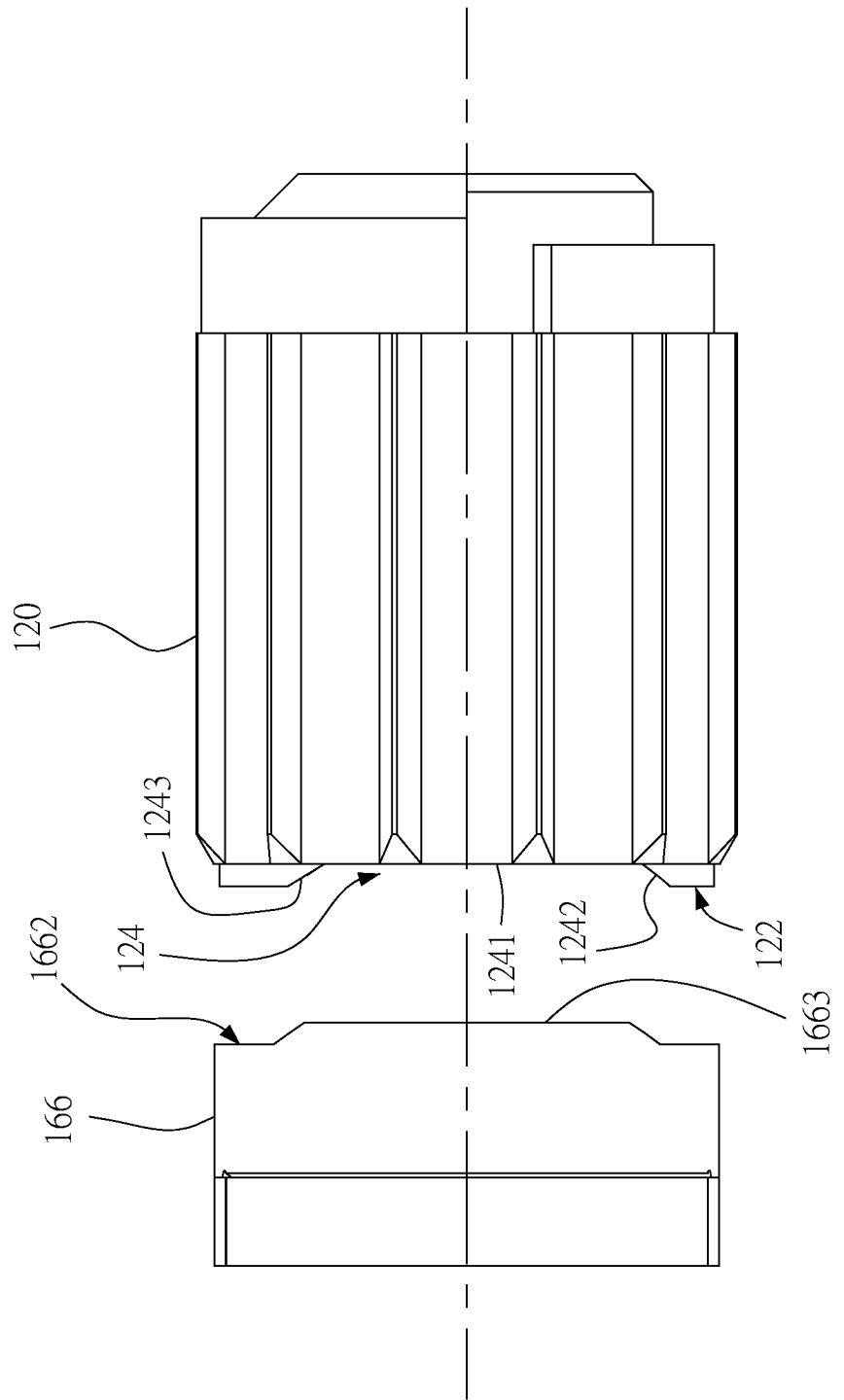
FIG. 9 and FIG. 10 are lateral views of a rotating sleeve and a cam member of the hinge device according to the embodiment of this disclosure.
Figure 10:
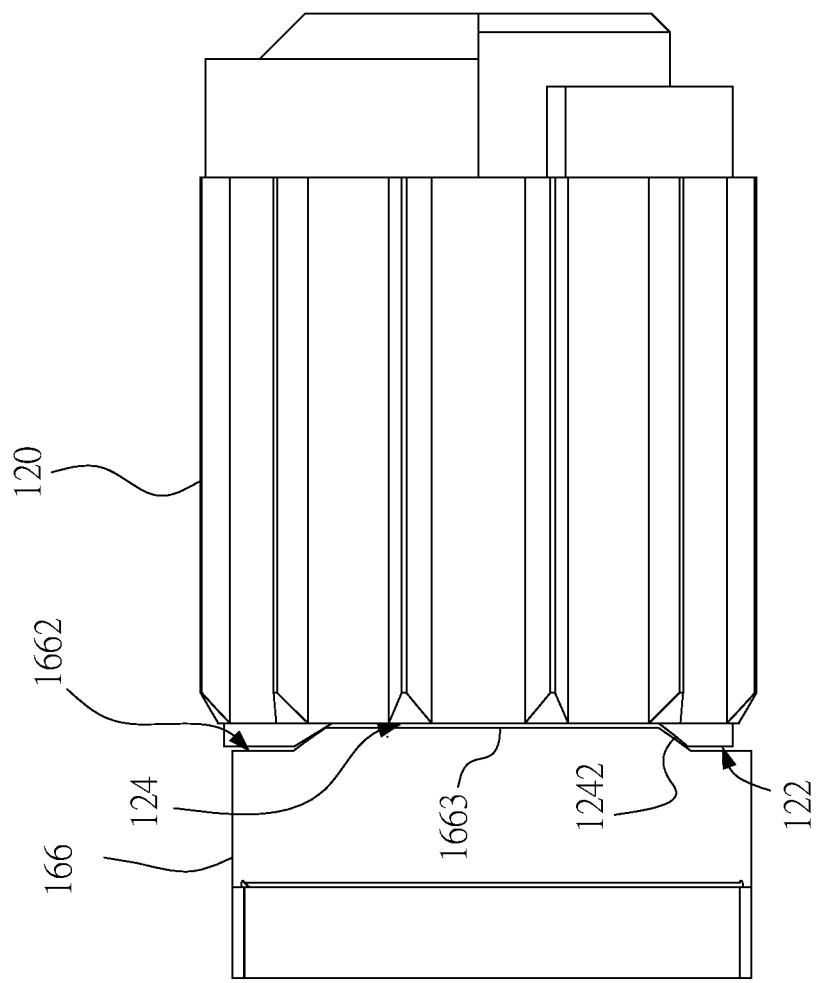

As shown in FIG. 9 and FIG. 10, the cam member 166 and the rotating sleeve 120 are combined together through cam structure. The rotating sleeve 120 includes a sleeve contact surface 122 facing the cam member 166, and the cam member 166 includes a cam contact surface 1662 facing the rotating sleeve 120. The sleeve contact surface 122 and the cam contact surface 1662 are configured to contact each other.

A bump 1663 and a recess 124 are respectively disposed on the cam contact surface 1662 and the sleeve contact surface 122. a the recess is provided with a bottom surface, a first inclined surface and a second inclined surface, the first inclined surface and the second inclined surface are connected to the bottom surface, and the bump is configured to engage into the recess, such that the bump contacts the first inclined surface and the second inclined surface.

The bump 1663 is located on the cam contact surface 1662, and the recess 124 is located on the sleeve contact surface 122. In another example, the bump 1663 is located on the cam contact surface 1662, and the recess 124 is located on the sleeve contact surface 122. The recess 124 includes a bottom surface 1241, a first inclined surface 1242 and a second inclined surface 1243. The first inclined surface 1242 and second inclined surface 1243 are respectively connected to two lateral edges of the bottom surface 1241, and arranged corresponding to a tangential direction of the fixed shaft 110. The configuration of the bump 1663 matches the configuration of the recess 124, for engaging into the recess 124. Therefore, at least two opposite sides of the bump 1663 contact the first inclined surface 1242 and the second inclined surface 1243.

The hinge device 100 includes an initial state and unfolded state.

Figure 11:
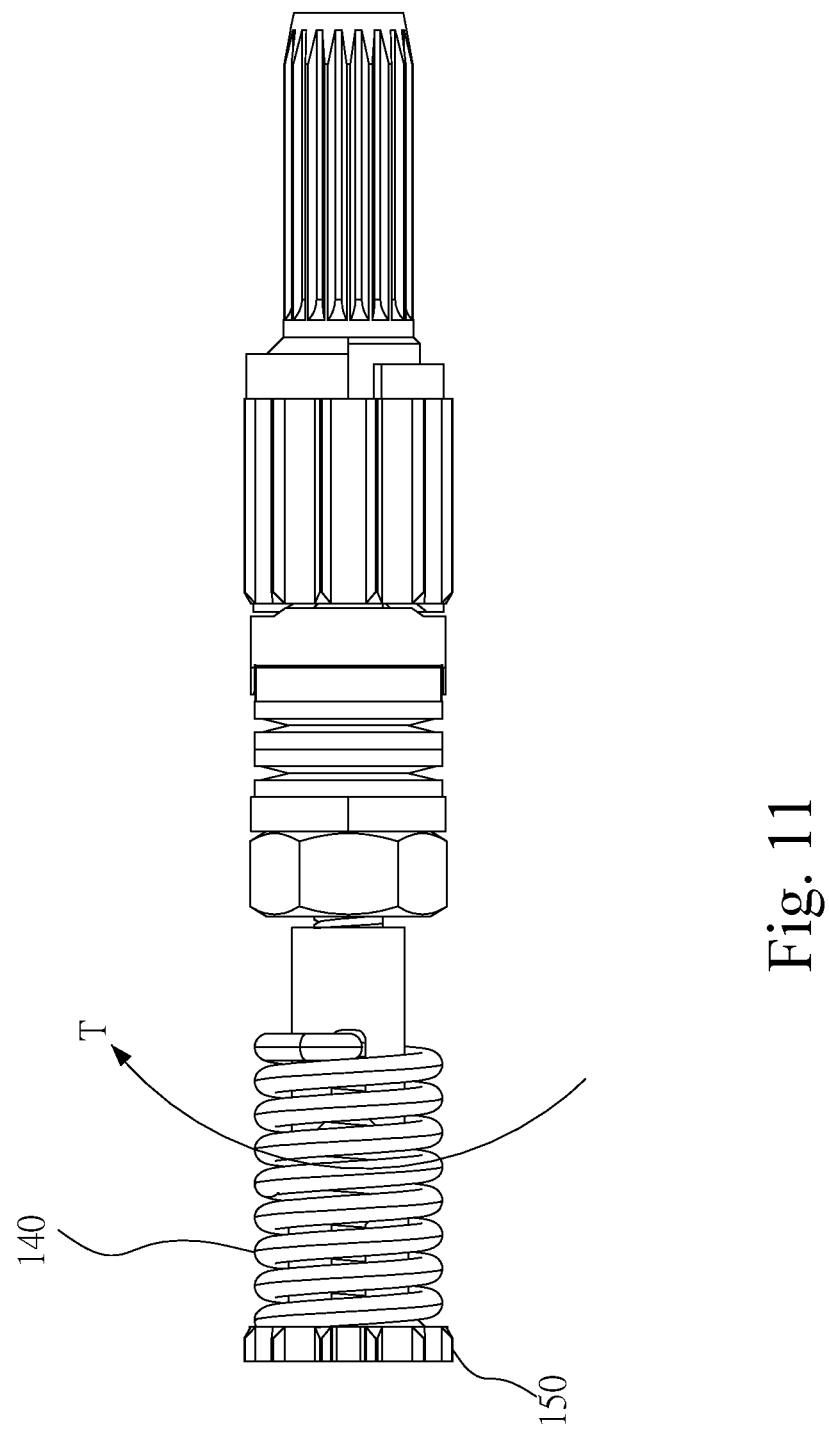
FIG. 11 is a lateral view of the hinge device of the hinge device according to the embodiment of this disclosure.

As shown in FIG. 10 and FIG. 11, in the initial state, the bump 1663 is engaged into the recess 124, and at least two opposite sides of the bump 1663 contact the first inclined surface 1242 and the second inclined surface 1243. The cam contact surface 1662 and the sleeve contact surface 122 fit to each other. Meanwhile, the torsion spring 140 withstands reverse torsion and generates forward torque T. Since the bump 1663 is engaged into the recess 124 to provide positioning effect, the forward torque T of the torsion spring 140 does not drive the rotating connection member 150 to rotate. The initial state is a state that the rotating member 220 is folded on the seat 210. In a foldable keyboard or a laptop computer, the initial state is the folded state.

Figure 12:
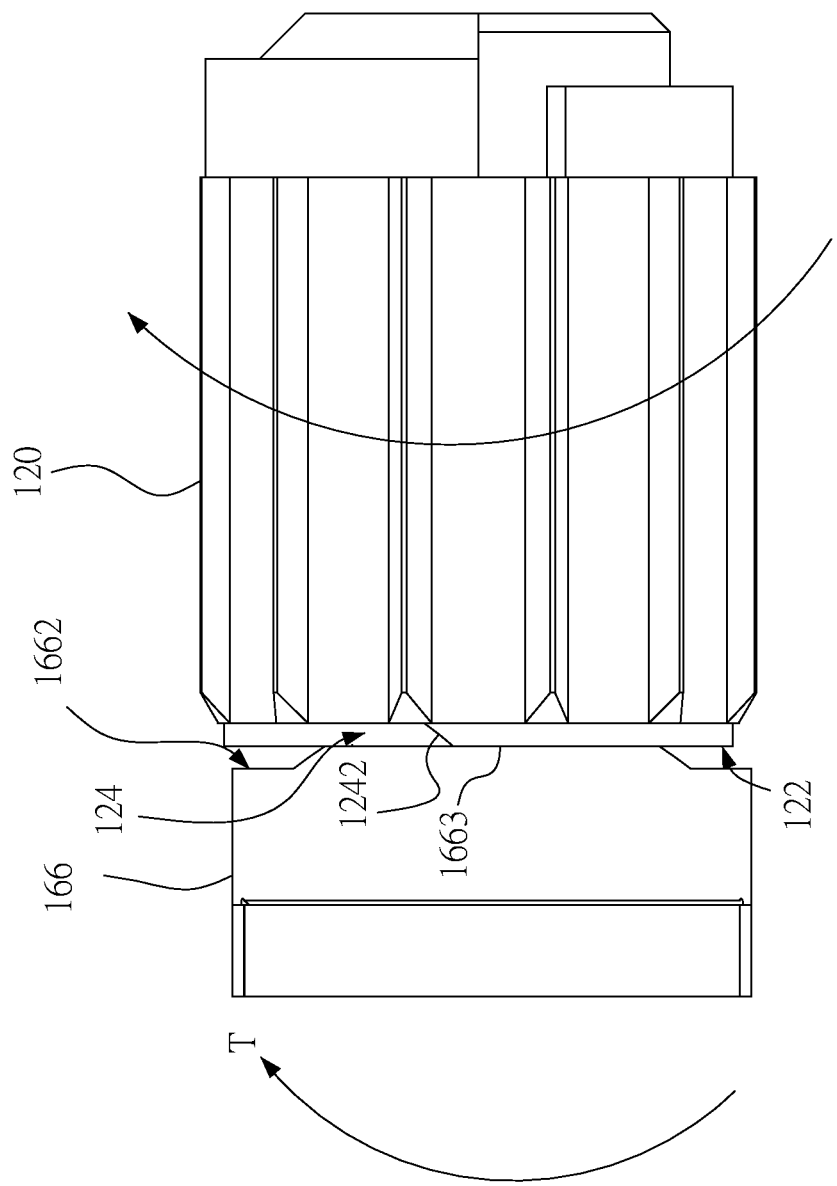
FIG. 12 is another lateral view of the rotating sleeve and the cam member of the hinge device according to the embodiment of this disclosure.

As shown in FIG. 12, in the unfolded state, the rotating member 220 rotates to travel a forward angle. Take FIG. 12 as an illustration, when the rotation vector points to the left, the forward rotation is that the rotating member 220 flips backward. The rotating member 220 also drives the rotating sleeve 120 and the rotating connection member 150 to rotate to travel a forward angle. At this time, the rotating sleeve 120 also rotates with respect to the cam member 166, such that the bump 1663 ejects from the recess 124 along the first inclined surface 1242. At this time, the torsion spring 140 provides the forward torque T, the forward torque T is transmitted to the rotating sleeve 120 via the rotating connection member 150 and the rotating member 220. Here, forward rotation means a rotation to release the torsion spring 140, while reverse rotation means a rotation to twist the torsion spring 140.

Under the neutralization of the forward torque T (the direction of the forward torque T is to drive the bump 1663 to eject from the recess 124), The peak value of resistance when the bump 1663 ejects from the recess 124 is neutralized. Therefore, when the user switches the hinge device 100 from the initial state (folded state) to the unfolded state, the user will not obviously feel the resistance peak generated by the bump 1663 ejecting from the reprocess 124. For example, when the user flips the foldable keyboard or the laptop computer from the folded state to the unfolded state, the user will not obviously feel the resistance peak generated by the bump 1663 ejecting from the reprocess 124. Therefore, the purpose of "open light" is satisfied. At this time, when the user switches the hinge device 100 from the initial state (folded state) to the unfolded state, the net torsional resistance is the frictional resistance generated by the bump 1663 minus the forward torque T.

As shown in FIG. 10 and FIG. 11, on the contrary, when the hinge device 100 recovers from the unfolded state to the initial state (folded state), the rotating member 220 simultaneously drives the rotating sleeve 120 and the rotating connection member 150 to rotate in reverse direction. Driven by the rotating connection member 150, the torsion spring 140 is twisted in reverse direction, and generates the forward torque T, in which the forward torque T is a torque to switch the hinge device 100 from the unfolded state to the initial state (folded state). At this time, The user will obviously feel the forward torque T generated by the torsion spring 140. For example, when the user folds the foldable keyboard or the laptop computer from the unfolded state to the folded state, the user will obviously feel the forward torque T generated by the torsion spring 140, such that the purpose of "close heavy" is satisfied. At this time, the rotating sleeve 120 also rotate with respect to the cam member 166, and the bump 1663 engages into the recess 124 along the first inclined surface 1242 to provide positioning effect. The user may obviously feel the bump 1663 engaging into the recess 124. Since the bump 1663 engaging into the recess 124 to provide positioning effect, the forward torque T of the torsion spring 140 will not drive the rotating connection member 150 to rotate, so as keep the hinge device 100 in the initial state (folded state).

Through the above approaches, when the hinge device 100 of this disclosure is unfolded from the folded state to the unfolded state, a forward torque T generated by the torsion spring 140 neutralizes the resistance generated by the cam member 166 and the frictional resistance. On the contrary, when the hinge device 100 switches from unfolded state to folded state, the forward torque T of the torsion spring 140 becomes main resistance, so as to satisfy the purpose of "open light, close heavy", such that it is easy to unfold the folded electronic device by one hand.

What is claimed is:

1. A hinge device, comprising:
   a fixed shaft, including a fixed end and a free end;
   a rotating sleeve, rotatably mounted on the fixed shaft, and located between the fixed end and the free end;
   a fixed connection member, including a coupling end and a connection end;
   wherein the coupling end is fixedly connected to the free end, and the connection end is provided with a first slot perpendicular to the fixed shaft;
   a torsion spring, includes a first end and a second end; wherein the first end is equipped with a first snap-in pin, the second end is equipped with a second snap-in pin, and the first snap-in pin is configured to insert into the first slot;
   a rotating connection member, including a fixed part and an extension part; wherein the extension part protrudes on the fixed part, and extends towards the fixed connection member; wherein the extension part is provided with a second slot perpendicular to the fixed shaft, and the second snap-in pin is configured to insert into the second slot; and
   a friction resistance assembly, disposed on the fixed shaft to provide torsional resistance to the rotating sleeve.

2. The hinge device as claimed in claim 1, wherein peripheral surfaces of the free end, the rotating sleeve and the fixed part are provided with knurls parallel to the fixed shaft; or peripheral surfaces of the free end, the rotating sleeve and the fixed part are provided with concave and convex structures.

3. The hinge device as claimed in claim 1, wherein the coupling end includes an insertion hole, and a cross-section of the insertion hole is non-circular; a cross-section of the free end of the fixed shaft is also non-circular and matches the cross-section of the insertion hole, such that the fixed connection member is not able to rotate with respect to the fixed shaft.

4. The hinge device as claimed in claim 1, wherein when the torsion spring and the fixed shaft are disposed coaxially, the first snap-in pin and the second snap-in pin are perpendicular to the fixed shaft.

5. The hinge device as claimed in claim 1, wherein the friction resistance assembly comprises:
   a stopper, fixed on the fixed shaft;
   a cam member, sleeved on the fixed shaft, wherein the cam member is configured to slide on the fixed shaft along an axial direction of the fixed shaft, and the cam member is fixed in a rotational direction with respect to the axial direction of the fixed shaft; and
   a compression elastic member, sleeved on the fixed shaft, and two ends of the compression elastic member respectively abut against the stopper and the cam member, such that the cam member contacts the rotating sleeve to provide the torsional resistance to the rotating sleeve.

6. The hinge device as claimed in claim 5, wherein the stopper is a screw nut screwed on the fixed shaft.

7. The hinge device as claimed in claim 5, wherein the fixed shaft includes a guiding section, a cross-section of the guiding section is non-circular; the cam member includes a guiding hole, a cross-section of the guiding hole matches the cross-section of the guiding section, and the cam member is sleeved on the guiding section.

8. The hinge device as claimed in claim 5, wherein the rotating sleeve includes a sleeve contact surface facing the cam member, the cam member includes a cam contact surface facing the rotating sleeve , and the sleeve contact surface and the cam contact surface are configured to contact each other.

9. The hinge device as claimed in claim 8, wherein a bump and a recess are respectively disposed on the cam contact surface and the sleeve contact surface; the recess is provided with a bottom surface, a first inclined surface and a second inclined surface, the first inclined surface and the second inclined surface are connected to the bottom surface, and the bump is configured to engage into the recess, such that the bump contacts the first inclined surface and the second inclined surface.

10. The hinge device as claimed in claim 9, wherein when the bump engages into the recess, the torsion spring provides a forward torque.

11. The hinge device as claimed in claim 1, further comprising a rotating member, the rotating member includes a sleeve fixing hole; wherein the rotating sleeve is disposed in the sleeve fixing hole and fixed to the rotating member, and the fixed part of the rotating connection member is disposed in the sleeve fixing hole and fixed to the rotating member.

12. The hinge device as claimed in claim 11, wherein the torsion spring is disposed in the sleeve fixing hole.

13. The hinge device as claimed in claim 1, further comprising a seat, wherein the seat includes a fixing hole, and the free end of the fixed connection member inserts into the fixing hole and is fixed in the fixing hole.

\* \* \* \* \*